(12) United States Patent
Benschop et al.

(10) Patent No.: US 8,239,921 B2
(45) Date of Patent: Aug. 7, 2012

(54) SYSTEM AND METHOD OF RETRIEVING A SERVICE CONTACT IDENTIFIER

(75) Inventors: Dirk Leonard Benschop, Etten-Leur (NL); Henderik Reinout Benschop, Rozenburg (NL)

(73) Assignees: DLB Finance & Consultancy B.V., Etten-Leur (NL); HITD Information Technology B.V., Rozenburg (NL)

( * ) Notice: Subject to any disclaimer, the term of this patent is extended or adjusted under 35 U.S.C. 154(b) by 1112 days.

(21) Appl. No.: 11/968,891

(22) Filed: Jan. 3, 2008

(65) Prior Publication Data

US 2009/0178117 A1    Jul. 9, 2009

(51) Int. Cl.
*G06F 21/00* (2006.01)
(52) U.S. Cl. ............. 726/3; 726/5; 713/182; 709/223
(58) Field of Classification Search .......... 713/182; 726/3; 705/319, 320
See application file for complete search history.

(56) References Cited

U.S. PATENT DOCUMENTS

| | | |
|---|---|---|
| 5,475,819 A | 12/1995 | Miller |
| 5,870,473 A | 2/1999 | Boesch |
| 6,298,383 B1 | 10/2001 | Gutman et al. |
| 6,453,327 B1 | 9/2002 | Nielsen |
| 6,457,060 B1 | 9/2002 | Martin, Jr. |
| 6,529,943 B1 | 3/2003 | Ohi |
| 6,615,231 B1 | 9/2003 | Deen et al. |
| 6,718,389 B2 | 4/2004 | Navarre et al. |
| 6,889,325 B1 | 5/2005 | Sipman |
| 6,952,769 B1 | 10/2005 | Dubey |
| 7,500,108 B2 | 3/2009 | Johnson et al. |
| 7,523,164 B2 | 4/2009 | Kantor et al. |
| 2002/0095488 A1 | 7/2002 | Primak |
| 2002/0156728 A1 | 10/2002 | Jaschhof et al. |
| 2002/0174194 A1 | 11/2002 | Mooney et al. |

(Continued)

FOREIGN PATENT DOCUMENTS

EP    0479660 A    4/1992

(Continued)

OTHER PUBLICATIONS

McGibney, "A Trust Overlay Architecture and Protocol for Enhanced Protection against Spam", 2007, pp. 749-756.*

(Continued)

*Primary Examiner* — Taghi Arani
*Assistant Examiner* — Gregory Lane
(74) *Attorney, Agent, or Firm* — Steven M. Koehler; Westman, Champlin & Kelly, P.A.

(57) ABSTRACT

Aspects of the invention relate to a system and method of retrieving a service contact identifier for providing a service to a user is proposed. The method is performed in a system comprising at least one server system configured for connecting to a user device of said user. The server system has access to a database comprising at least a first service contact identifier required for providing a first service and a second service contact identifier required for providing a second service. The first service is identified by a first service identifier. The first service contact identifier and second service contact identifier are different service contact identifiers. The first service identifier and a service contact identifier are received from the user device of said user. The first service contact identifier may then be retrieved in dependence of the received first service identifier and the received service contact identifier, irrespective of whether said received service contact identifier is said first service contact identifier or said second service contact identifier.

32 Claims, 10 Drawing Sheets

U.S. PATENT DOCUMENTS

| | | |
|---|---|---|
| 2003/0018721 A1 | 1/2003 | Gupta |
| 2003/0023873 A1 | 1/2003 | Ben-Itzhak |
| 2003/0026396 A1 | 2/2003 | Weik |
| 2003/0112948 A1 | 6/2003 | Brown et al. |
| 2003/0154165 A1 | 8/2003 | Horn |
| 2003/0172159 A1 | 9/2003 | Schuba et al. |
| 2003/0204719 A1 | 10/2003 | Ben-Itzhak |
| 2003/0233318 A1 | 12/2003 | King et al. |
| 2004/0019651 A1 | 1/2004 | Andaker |
| 2004/0176072 A1 | 9/2004 | Gellens |
| 2004/0205135 A1 | 10/2004 | Hallam-Baker |
| 2005/0021649 A1 | 1/2005 | Goodman |
| 2005/0081051 A1 | 4/2005 | Girouard |
| 2005/0111648 A1 | 5/2005 | Roome |
| 2005/0177385 A1 * | 8/2005 | Hull et al. ............ 705/1 |
| 2005/0249214 A1 | 11/2005 | Peng |
| 2005/0273857 A1 | 12/2005 | Freund |
| 2006/0020692 A1 * | 1/2006 | Jaffray et al. ............ 709/223 |
| 2006/0080542 A1 * | 4/2006 | Takeuchi et al. ............ 713/182 |
| 2006/0168024 A1 | 7/2006 | Mehr et al. |
| 2006/0187901 A1 | 8/2006 | Cortes et al. |
| 2006/0224681 A1 | 10/2006 | Wurster |
| 2006/0239190 A1 | 10/2006 | Kumar et al. |
| 2006/0253597 A1 | 11/2006 | Mujica |
| 2006/0265325 A1 | 11/2006 | Fajardo |
| 2007/0078929 A1 | 4/2007 | Beverly |
| 2007/0124226 A1 | 5/2007 | Garner, Jr. |
| 2007/0180039 A1 * | 8/2007 | Sutidze et al. ............ 709/206 |
| 2008/0052324 A1 | 2/2008 | Choubey |
| 2008/0098466 A1 * | 4/2008 | Yoshida et al. ............ 726/5 |
| 2008/0147837 A1 | 6/2008 | Klein et al. |
| 2008/0192918 A1 | 8/2008 | Benschop |
| 2008/0194234 A1 | 8/2008 | Benschop |
| 2008/0195515 A1 | 8/2008 | Benschop |
| 2008/0195713 A1 | 8/2008 | Benschop |
| 2008/0196092 A1 | 8/2008 | Benschop |
| 2008/0196093 A1 | 8/2008 | Benschop |
| 2008/0196094 A1 | 8/2008 | Benschop |
| 2009/0012878 A1 * | 1/2009 | Tedesco et al. ............ 705/27 |
| 2009/0150166 A1 * | 6/2009 | Leite et al. ............ 705/1 |
| 2009/0158403 A1 | 6/2009 | Benschop |
| 2009/0171821 A1 | 7/2009 | Denker et al. |
| 2009/0187666 A1 | 7/2009 | Benschop |
| 2010/0202337 A1 * | 8/2010 | Wienand ............ 370/312 |

FOREIGN PATENT DOCUMENTS

| | | |
|---|---|---|
| EP | 0813162 A | 12/1997 |
| EP | 1180748 A | 2/2002 |
| EP | 1180756 A | 2/2002 |
| EP | 1282087 | 2/2003 |
| EP | 1457912 | 9/2004 |
| EP | 1496655 A | 1/2005 |
| JP | 2002351830 | 12/2006 |
| NL | 1022704 C2 | 8/2004 |
| WO | WO 98/42173 | 10/1998 |
| WO | WO 00/42748 A | 7/2000 |
| WO | WO 01/72002 | 9/2001 |
| WO | WO 02/075547 | 9/2002 |
| WO | WO 03/003234 A | 1/2003 |
| WO | WO 03061213 A | 7/2003 |
| WO | WO 2004/036855 | 4/2004 |
| WO | WO 2004/071035 | 8/2004 |
| WO | WO 2004/075086 A | 9/2004 |
| WO | WO 2004/088455 A | 10/2004 |
| WO | WO 2005124621 | 12/2005 |
| WO | WO2008154953 * | 12/2008 |

OTHER PUBLICATIONS

Official Search Report of the European Patent Office in counterpart foreign application No. PCT/NL2008/050003 filed Mar. 1, 2008.

Sandhu R.S. et al: Access Control: Principles and Practice, IEEE Communicationas Magazine, vol. 32, No. 9, Sep. 1, 1994, pp. 40-48.

Notice of Reasons for Rejection for Japan Application No. 2010-541412, Drafted Mar. 15, 2012, 2 pages.

* cited by examiner

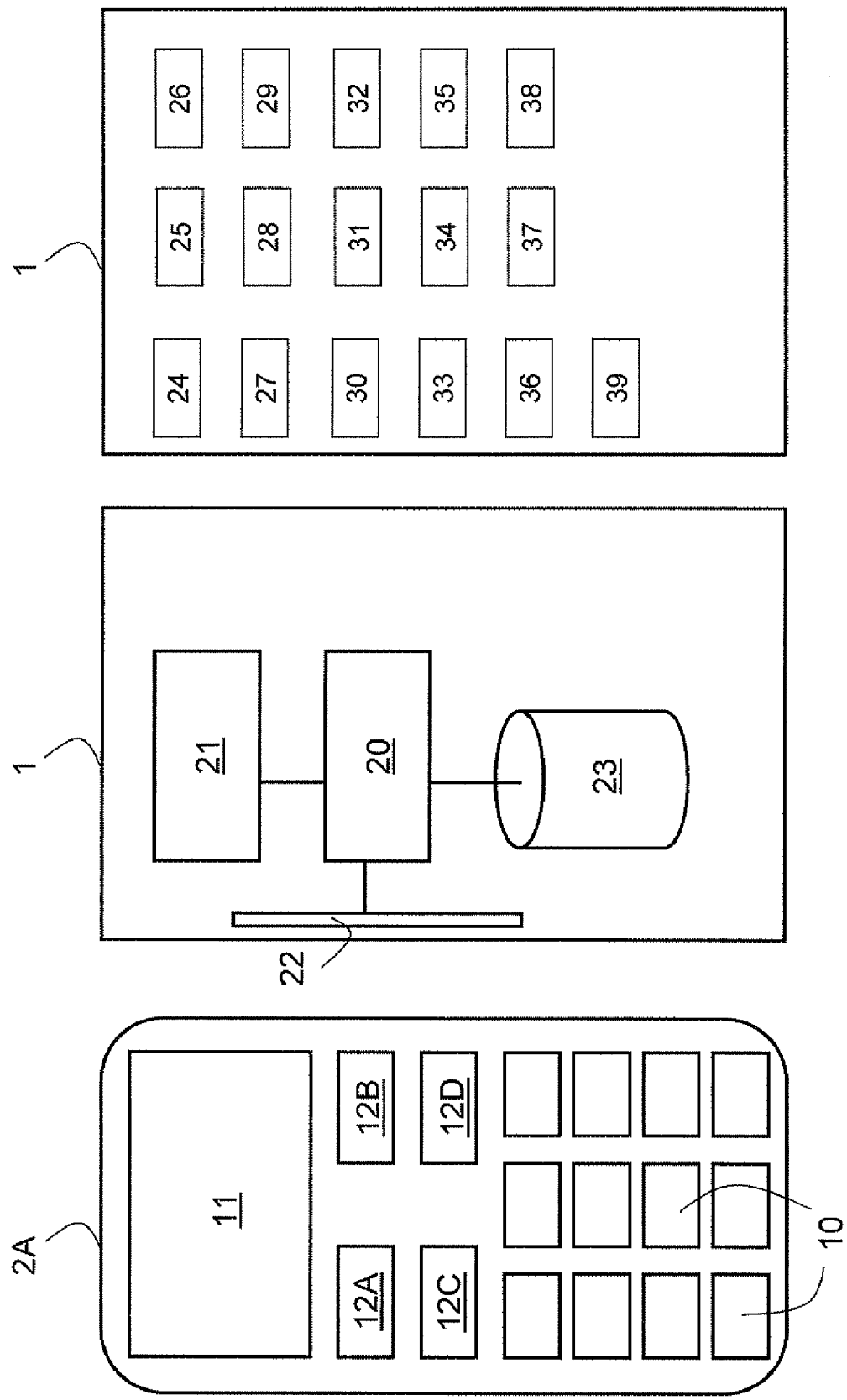

SYSTEM AND METHOD OF RETRIEVING A SERVICE CONTACT IDENTIFIER

BACKGROUND

The discussion below is merely provided for general background information and is not intended to be used as an aid in determining the scope of the claimed subject matter.

The use of communication devices for (electronic) services has become very popular in the last two decades. Mobile telephony and electronic banking are examples of electronic services that heavily penetrated the daily life of people. Other examples include electronic mail and use of the internet, such as visiting web pages with information, participating in electronic friends networks and contributing to web discussions. Other services relate to regular mail delivery and electronic route navigation.

The ever increasing possibilities of electronic services go along with a significant amount of information people need to possess to make use of these electronic services. As a typical example, one needs to know a telephone number for contacting another person by telephone, an e-mail address to send an e-mail to this same person, a uniform resource locator (URL) to visit the website of this person, a bank account number to wire money to the bank account of this person etc. Moreover, in order to have a package or letter delivered by regular mail, one needs to know the delivery address. Furthermore, in order to make use of a route navigation service, one needs to know details about the destination location.

Thus, the variety of available services requires users of these services to possess specific service contact details of an intended recipient of these services.

In the prior art, attempts have been made to bring a variety of these services under a single service contact identifier, such as a telephone number.

As an example, it is known in the art to use a single telephone number of a recipient for obtaining telephony services, internet services and payment services as exemplified by the ENUM initiative (www.enum.nl). The telephone number is processed and a service is requested after the processing.

However, the user of the services is still required to possess the telephone number of the recipient. This requirement may also be disadvantageous for using other services than telephony, because the telephone number is also required for the payment service and the internet service. In other words, even if the user would possess the bank account number of the recipient, he would not be capable to wire money to the recipient in the absence of a telephone number of the recipient of the payment.

There is a need in the art to provide an improved method and system for allowing users to make use of a service.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

It is an object of the invention to provide an improved method and system for allowing users to make use of a service.

A method of retrieving a service contact identifier for providing a service to a user is proposed. The method is performed in a system comprising at least one server system configured for connecting to a user device of said user. The server system has access to a database comprising at least a first service contact identifier required for providing a first service and a second service contact identifier required for providing a second service. The service contact identifiers may be identifiers relating to contact details of an intended recipient (device) of the service. The first service is identified by a first service identifier. The first service contact identifier and second service contact identifier are different service contact identifiers. The first service identifier and a service contact identifier are received from the user device of said user. The first service contact identifier may then be retrieved in dependence of the received first service identifier and the received service contact identifier, irrespective of whether said received service contact identifier is said first service contact identifier or said second service contact identifier.

Moreover a computer program such as embodied on a computer readable medium (e.g. computer storage medium) for executing the method and a carrier therefore are proposed.

A server system configured for retrieving a service contact identifier for providing a service to a user is also proposed. The server system comprises a database comprising at least a first service contact identifier required for providing a first service and a second service contact identifier required for providing a second service. The first service is identified by a first service identifier. The first service contact identifier and second service contact identifier are different service contact identifiers. The system comprises a receiver configured for receiving the first service identifier and a service contact identifier from the user device of said user. The server system also comprises a retrieval module configured for retrieving the first service contact identifier from the database in dependence of the received first service identifier and the received service contact identifier, irrespective of whether said received service contact identifier is said first service contact identifier or said second service contact identifier The proposed method and system allow the user to transmit an arbitrary service contact identifier to the system in combination with a service identifier indicating the service he desires to use. The received arbitrary service contact identifier may then be used to trace the first service contact identifier belonging to the received first service identifier. Thus, if the user possesses an arbitrary service contact identifier of an intended recipient or delivery party/address of a service, he may be able to use that service in relation to that recipient/delivery address. As an example, the user may transmit a service identifier indicating that he desires to use a telephony service in combination with a bank account number of the recipient of the telephone call to the system. The system then traces the telephone number of the recipient using the telephony service request and the bank account number of the recipient. On the other hand, the user may wire a payment to the recipient by transmitting a payment service request in combination with a telephone number of the recipient of the payment service.

In one embodiment, the use of an arbitrary one of at least three service contact identifiers to obtain information relating to one of at least three corresponding services is provided.

In another embodiment, a plurality of services from which at least two may be selected is provided.

In yet another embodiment, the system itself provides the service corresponding to the first service identifier. Of course, the system may also trigger external service providers to perform the requested service. Such a trigger may be provided automatically or in response to the result of an internal decision algorithm. The internal decision algorithm may e.g. relate to the question whether or not the intended recipient of the service has subscribed to use the services provided by the system.

In a further embodiment, the user is provided with service contact details for allowing the user to perform the corresponding service, e.g. via another system.

In one embodiment a finely tuned decision process on whether or not the first service contact identifier should be retrieved and/or a corresponding service should be provided on the basis of a requirement list of the recipient and a user profile of the user of the service is provided. The recipient/destination party is thus totally in control of his contacts by setting the criteria of his requirement list. The embodiments relate to permitting or denying service using information (items and criteria) that is usually irrelevant for providing the service.

While the above embodiments relate to a check of the item of the user profile against a criterion of the recipient requirement list, other embodiments also require a check in the opposite direction, i.e. whether or not an item of the recipient profile matches a corresponding criterion of the user requirement list. The first situation is advantageously used in blacklisting and white listing approaches (where the initiative is mainly with the recipient) whereas the second situation relates to a handshake or mutual approval situation, wherein the differentiated approach can be used to advantage. The mutual approval situation has been described for telephony services using a personal identifier in the non-prepublished international patent application PCT/NL2007/050553 of the applicant and is herewith incorporated in the present patent application by reference in its entirety.

The user requirement list can be obtained from a user identifier received from the recipient or from login data of the user.

The system may be configured for providing a plurality of services, including telephony services, IP telephony services (e.g. VoIP), electronic messaging services, media streaming services, web browsing services, payment services, regular mail services and route navigation services, each identified by a corresponding service identifier. In another embodiment, a combination of an item of a profile and a corresponding criterion of a requirement list may be applicable for at least two services is provided. The embodiments allow that non-fulfilment of criteria of a requirement list has consequences for various services. As an example, if an item of a profile indicates that the owner of this profile is an e-mail spammer, this may not only influence the use of e-mail services, but also of other services, such as a telephony service and/or a regular mail service. Services for which criteria of a requirement list apply can be selected in accordance with the other embodiments.

The service contact identifiers of recipients/delivery parties/destination parties may include a device contact identifier, e.g. a telephone number, and personal contact identifiers, e.g. an e-mail address, a home address, or a login name. At least one of the criteria of the requirement list(s) is independent of these service contact identifiers and therefore provides the possibility of a greater degree of differentiation.

Items from the profile(s) may be system items and/or user defined items. System items relate to the behaviour of the user and/or recipient on the system. A particular example of a system item is the spam behaviour of the user and/or recipient on the system. The spam behaviour in the system can be registered as a result of one or more spam notification signals received from addressees of e.g. an electronic message. These methods and systems have been described in the non-prepublished international patent applications PCT/NL2007/050557 and PCT/NL2007/050555 which are incorporated in the present application by reference in its entirety. User defined items (and the corresponding criteria) relate to items and criteria not presented as default by the system. Such user defined items provide greater flexibility for the users and recipients.

Of course, items of the profile list(s) may be empty, correct or incorrect. Other embodiments allow for a differentiation of verified items and unverified items. There is a high probability of correctness for verified items, whereas for unverified items the probability of correctness is unpredictable. Yet other embodiments allow the users and/or recipients to indicate whether the item checked against a criterion of the requirement list of the user and/or recipient should be a verified item. This feature reduces the chance that that a user or recipient becomes involved in a service transaction that is not desired or intended.

Items may be blocked from checking against criteria of a requirement list. The indication of the prevention of such checking of items may be set by default and/or upon indication from a user device. This feature avoids the possibility of undesired fishing expeditions for items of a profile by submitting various service requests to the system and see if the items of the targeted recipient match the criteria of the user requirement list. These embodiments are particularly relevant to the mutual approval situation, but may also apply to black listing and white listing situations. Other embodiments allow a permanent or temporary release of the restrictions applying to the checking of the items.

Hereinafter, embodiments of the invention will be described in further detail. It should be appreciated, however, that these embodiments may not be construed as limiting the scope of protection for the present invention.

BRIEF DESCRIPTION OF THE DRAWINGS

In the drawings:

FIG. 2 shows a schematic illustration of the electronic device configured for use with the system of FIG. 1;

FIGS. 3A and 3B show schematic illustrations of the system of FIG. 1;

DETAILED DESCRIPTION OF THE ILLUSTRATIVE EMBODIMENT

Figure 1:
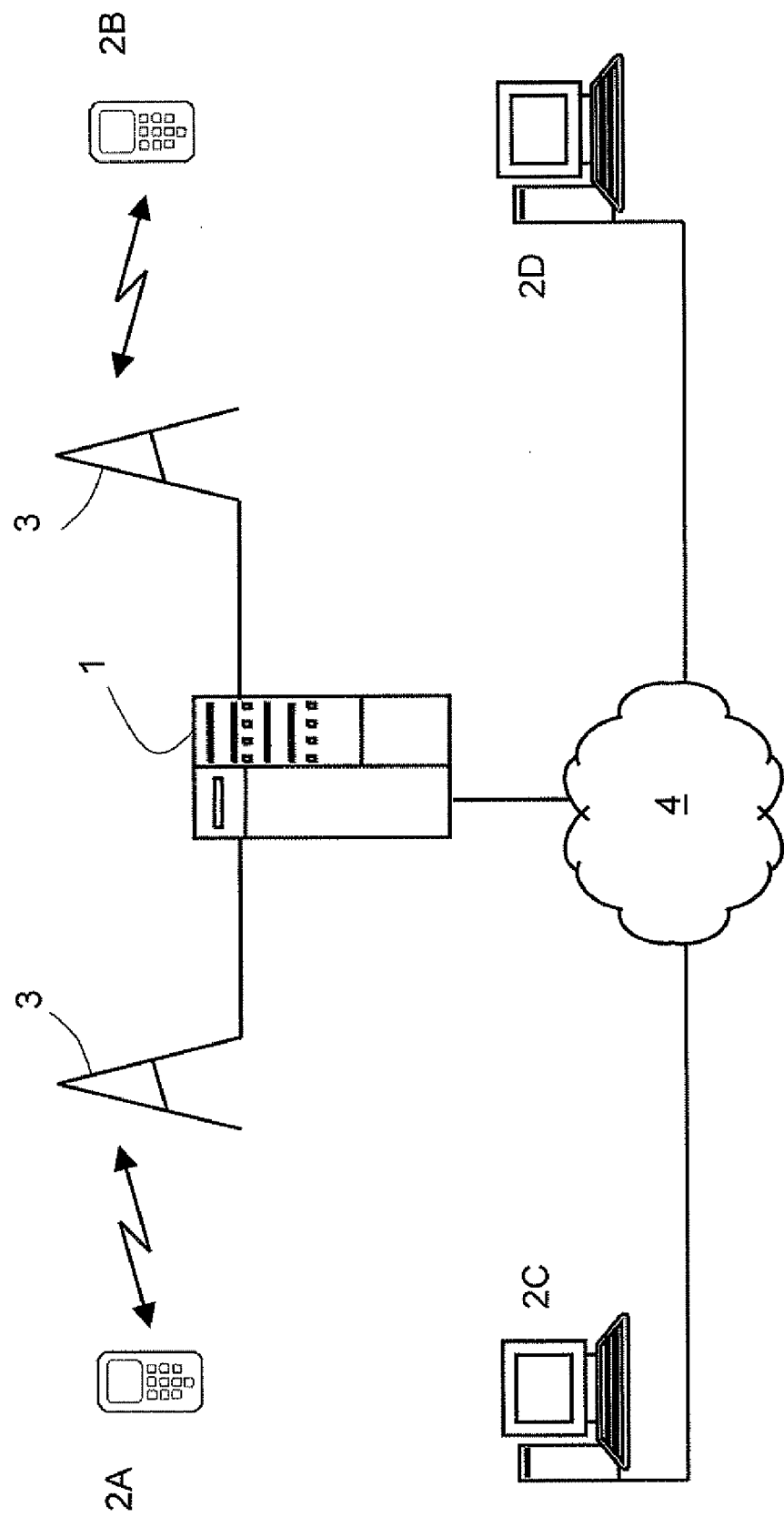
FIG. 1 shows a schematic illustration of a server system according to a first embodiment.

FIG. 1 shows a server system 1 communicatively connected to electronic devices 2A-2D. Mobile devices 2A, 2B are connected via wireless access networks 3 to the server system 1. Stationary devices 2C, 2D are connected via network 4, such as the internet or a local area network, to the server system 1. The network connections may be secured. In the following, it will be assumed that the devices 2A, 2C are used by a user of the server system 1, whereas devices 2B, 2D are devices of a recipient.

Mobile device 2A, schematically shown in FIG. 2, may be a mobile phone comprising a keyboard with a plurality of (numerical and/or alphanumerical) keys 10 and a display 11. Furthermore, the mobile device 2A comprises service identifier keys 12A, 12B, 12C, 12D. These keys allow a user to communicate a service he desires to use to the server system 1. It should be appreciated that the keys 12A-12D are not necessarily separate keys, but may also be implemented otherwise, e.g. by one or more soft keys using the display 11 to indicate the function of the soft key at a particular moment. Selection of a service may also be made from a software menu. It should also be appreciated that the same functionality is possible for a stationary device 2C. Finally, it is noted that the type of service desired by the user of the devices 2A, 2C may also be implicit from the message sent to the server system 1. As an example, if the user device 2A, 2C transmits a money value, it may be implicit that a payment service is requested.

FIGS. 3A and 3B show schematic illustrations of the server system 1.

The server system 1 comprises a processor 20, a memory 21, a network adapter 22 for communication with one or more of the devices 2A-2D via the networks 3, 4 and a relational database 23. The database 23 may be provided internal to or external from the system 1 and the data stored in the database 23 may be distributed over a plurality of databases. It should be appreciated that the server system 1 is normally capable of connecting to more than the four electronic devices 2A-2D shown in FIG. 1.

The specific functions of the server system 1 are schematically illustrated in FIG. 3B and will now be described in further detail. It should be appreciated that the functions may be largely implemented as software code portions of one or more computer programs embodied on one or more computer readable mediums (e.g. computer storage mediums) accessible to and executed on the processor 20 (server 1).

The server system 1 comprises a receiver 24 configured for receiving a service identifier and a service contact identifier of the recipient/destination from the user devices 2A, 2C. Identifiers of the users may be received from the recipient devices 2B, 2D. The identifiers may include a telephone number, an e-mail address, a bank account number, a URL, a home address, a navigation location etc.

The server system comprises a retrieval module 25 configured for retrieving a service contact identifier corresponding to the received service identifier and a received arbitrary service contact identifier stored in the database 23. The received service identifier indicates the service desired by the user and thus determines the service contact identifier retrieved from the database 23 in combination with the arbitrary service contact identifier stored in the database for a particular recipient/delivery address.

The server system 1 also contains one or more service providers, such as a payment service provider 26 and a communication service provider 27. The payment service provider 26 is configured for providing the payment service for making a payment to the recipient on the basis of a corresponding service contact identifier of the recipient. The communication service initiator 27 is configured for initiating, and possibly establishing, a communication service, such as a telephony service, an electronic message service, a streaming media service and/or a web browsing service for establishing communication with the recipient using a corresponding service identifier for establishing the communication. The server system may also comprise a regular mail service provider and/or a navigation service provider (not shown). The regular mail service provider provides the appropriate delivery address for a package or letter to be sent. The navigation service provides a route from a particular location to another location associated with the destination.

In order to identify the type of service requested by the users of the electronic devices 2A, 2C, the server system 1 has a service identifier analyser 27 configured for analysing the service identifier from a service request the mobile devices 2A, 2C. The service identifier may relate to a communication service, a payment service, a regular mail service and a navigation service.

It should be appreciated that a composed message may be received from the user device(s) 2A, 2C containing the service identifier, an arbitrary service contact identifier and/or other data such as a monetary value for a payment service, an attachment and/or other contents.

The server system 1 also contains a payment connection module 29 for connecting to a payment system for making use of an external payment service using the payment address identifier and a communication connection module 30 for connecting to an external communication system for initiating the communication service using the communication address identifier. Other modules include a regular mail connection module and/or a navigation connection module. These modules may be used for recipients using e.g. payment, communication, regular mail and navigation services provided external to the server system 1. The server system 1 may have a determination module 31 configured for determining whether the recipient uses the payment service and/or the communication service of the server system 1 or an external system.

The server system 1 also comprises a login module 32 for receiving a login request from the device(s) 2A, 2C. The login request comprises at least one personal identifier in order to identify a user of the device 2A, 2C. Preferably, the user is identified by a combination of a user name and a password. The users are subscribers to the server system 1 in such a case.

The communication with the user devices 2A, 2C may be secured by e.g. secured network connections and/or data encryption techniques. In order to further increase the security, the server system comprises a variable session key issuer 33. The variable session key issuer is configured for issuing different session keys in response to subsequent requests from the user devices 2A, 2C. The issuer 33 may use random numbers but also outside parameters (such as e.g. a temperature measured by a temperature sensor at a particular location) to obtain the variable keys.

The database 23 of the server system 1 may store profiles containing one or more items (e.g. characteristics of the user) and requirement lists containing one or more criteria from users of the user devices 2A, 2C and/or recipients using devices 2B, 2D. The profiles and requirement lists available to the server system 1 can be used to enable the users and/or the recipients to fine tune conditions under which they want to be involved in a service, e.g. in a payment transaction, a communication service, a regular mail service and/or a navigation service, as a recipient or destination party. It should be appreciated that this manner of enabling and disabling communication differs from the prior art in that the enabling or disabling is not primarily based on a service contact identifier of the devices and/or the user.

To that end, the server system 1 comprises a tracer 34 configured for tracing at least one requirement list of a user and/or a recipient. The requirement list of the recipient can be traced using the received or retrieved service contact identifier of the recipient. The same holds for the requirement list of the user, although this list may also be traced on the basis of other data in the request from the user device 2A, 2C.

Furthermore, the server system 1 has an analyser 35 configured for checking whether one or more items of a profile satisfy one or more criteria of a requirement list as will be explained in further detail below. Items and corresponding criteria may relate to a variety of personal details, not being the service contact identifier, including age, gender, body characteristics (e.g. hair colour, length), financial details, company details, geographic details (e.g. place of living, place of birth, address, street, p.o. box), personal items (e.g. preferences, such as brand preferences, social preferences (sports, communities, etc.)). Items may be user defined. Preferably, the fulfilment of all criteria by the items is analyzed.

The items and corresponding criteria may also relate to the system, such as e.g. the behaviour of the user and/or recipient on the server system 1. As an example, the server system may set a spam flag as an item in the profile of a user or recipient when this user or recipient has been notified as a spammer. Examples of such notification are provided in the international patent applications PCT/NL2007/050557 and PCT/NL2007/050555 of the applicant which are incorporated in the present patent application by reference in its entirety.

Briefly, these applications describe a system and method of reducing the proliferation of electronic messages in a server system comprising one or more servers for distributing the electronic messages. The method involves providing at least one electronic message or a portion thereof and receiving at least one spam notification signal related to said electronic message or said portion thereof. A portion of an electronic message may e.g. comprise one or more fields of the electronic message or a new portion assembled on the basis of fields or characteristics of the electronic message. Access to the electronic message (and/or the portion thereof) and/or to other (previous or future) electronic messages of the same source is restricted in response to receiving said at least one spam notification signal. The number of spam notification signals resulting in the restriction of access to the electronic message may be set. As an example, the number may be set to 50, 25, 10, 5 or even 1 spam notification signal before access to the electronic message is restricted.

In this context, the applicant has realized that the conventional rule set used for recognizing e-mail spam messages is always outdated, despite the regular updates of the rule set provided by the spam filter developers. Ultimately, only human beings will be able to recognize e-mail spam messages. Moreover, the applicant has realized that the improvement of spam filters contributes to the increase of the total amount of spam rather than reducing it. The applicant, therefore, proposes to (solely) use spam notification signals from users to detect electronic spam messages and, upon receipt of such a spam notification signal, to restrict access to the corresponding electronic message for other (users of) user devices. The server system thus allows that addressees of an electronic message themselves determine what electronic messages are spam messages and that the addressees are subsequently able to determine the access (rights) of other addressees to that message (and possibly other previous and/or future electronic messages from the same source). In other words, the spam notification signal is an order to the server system to restrict access to messages. In case of multiple spam notification signals, each signal can be regarded as a partial order. As an example, the other (users of) user devices may not display or download the electronic message. Spam filters using spam recognition rule sets, spam parameters and criteria may be absent in the server system, at least for those electronic messages for which a spam notification signal has been received.

Spam notification messages may be set or received for other services than electronic mail, where the system or the recipient/destination party finds a person abuses the system.

For example, for telephony services, a system and method can be applied for establishing a telephone connection between a first subscriber device (A-subscriber device) and a second subscriber device (B-subscriber device) in a telephone system. The telephone system is arranged for connecting the A-subscriber device (the calling party) and the B-subscriber device (the called party). The method includes receiving a request from the A-subscriber device to establish a connection with the B-subscriber device and also receiving a personal identity code of a user of said A-subscriber device. The connection can be established between the A-subscriber device and the B-subscriber device only after having received said personal identity code of said user of said A-subscriber device.

By receiving a personal identity code of a user, the telephone system is able to actually recognize the person that is requesting services of the system instead of only recognizing the device that is used. Consequently, the telephone system can apply measures to a particular user instead of only to a device as a result of the received authentication information. In other words, measures applied to a particular users cannot be avoided or circumvented by using a different device. An example of such a measure may be restricting the access of a particular user to services of the telecommunication system.

In order to make spam notification, the system and method may allow receiving one or more access restriction signals and restrict access to at least one of said telephone system and a user of said A-subscriber device or said B-subscriber device for at least one of said user of said A-subscriber device and said user of a B-subscriber device in response to receiving said one or more access restriction signals.

The user of the B-subscriber device has the possibility to restrict access to the telephone system for the user of the A-subscriber device if the telephone call is perceived by the user of the B-subscriber device as unsolicited or undesired. Access is restricted on the basis of the personal identity code of the user of the A-subscriber device and, therefore, this user cannot simply circumvent this measure by using a different A-subscriber device. The personal identity code may e.g. be stored such that further attempts to establish a connection by the person owning the code are first checked against this storage before a connection can be established.

The telephone system spam notification method and system is the subject of a non-prepublished patent application PCT/NL2007/050553 of the applicant which is incorporated in the present application in its entirety.

The system item relating to spam may be set in the above-described manner. The system and/or users may determine whether this spam item relates to a single service or to multiple services.

Of course, a possibility exists that the items of the user profile or recipient profile do not appropriately reflect the personal details. For example, a user or recipient item may indicate that the user or recipient is female at the age of 20, while in fact he is a 45-year old male. As another example, a user or recipient item may indicate that his bank balance is below 50000 Euros, whereas in fact his bank balance is above 100000 Euros. To that end, the server system 1 distinguishes between verified items and unverified items. As an example, if the server system 1 provides payment services using payment service provider 26, an item relating to the bank balance of a user or recipient can be verified internally, since the bank balance is recorded in the server system 1. In other cases, such as gender or age, verification may be performed by checking external registers, requiring users and recipients to submit a copy of the passport etc. to verify the validity of the item. Verification of unverified items may also take place by verifying changes in the items, such as changes in age or gender. Age should always change upwards with one year at the time, whereas gender generally would not change at all. If such items change in an unexpected manner, the items may be set to be unverified, either indefinitely or not. As a severe measure, the complete profile may also be marked as not trustworthy.

In order to increase certainty, the server system 1 comprises a verification indication receiver 36 configured for receiving and processing a verification indication from a device 2A, 2C of the user and/or a device 2B, 2D of a recipient. By means of the verification indication, the user and/or recipient may indicate that one or more criteria of the requirement list(s) should relate to verified item(s) of the profile(s).

Although the profile items are safely secured within the server system 1 and cannot be requested as such from outside the server system 1, in principle it would be possible to obtain an estimate of one or more items, e.g. one's bank balance, by making various requests to the server system 1 sending a service contact identifier of this person. The server system 1 may therefore be configured such that items of the profiles of the user and/or the recipient are by default prevented from checking. Furthermore, the server system 1 comprises a checking prevention indication receiver 37 configured for receiving and processing a checking prevention indication from a device 2A, 2C of a user and/or a device 2B, 2D of a recipient. The checking prevention indication indicates a request from a user and/or recipient that one or more items of said profile are prevented from checking by the analyser 35.

In the server system 1 as described above, there exist various situations wherein an item is not available for checking against a criterion. Examples include the situation wherein a profile does not contain an item required for checking against a criterion of a requirement list (e.g. when the item is not filled in or does not even exist) and the situation wherein an item is prevented from checking by the default setting or by a checking prevention indication signal (see previous paragraph). In order to allow the user or recipient to decide to be engaged in the service, the server system 1 comprises a notification transmitter 38 configured for transmitting a notification request to a device 2A-2D of the user or recipient from whose profile the check would be made, e.g. by means of a pop-up screen on the device. The notification request may present an option to ignore e.g. the checking prevention indication to permit checking of said at least one item against a corresponding criterion of a requirement list or to fill in an item. If the user/recipient permits checking, the prevention indication may be lifted either permanently or temporarily by the server system 1 receiving such an instruction from the devices 2A-2D. As an example, if a user desires to communicate with a recipient by telephone and the recipient requirement list indicates that this is only possible if the bank balance of the user is checked as an item on the user profile list against a corresponding criterion on the recipient requirement list, the user should first permit checking of his bank balance before the communication is established. The release of the checking prevention indication does not mean that this information is communicated to the other party. It only involves the availability of an item for a check against the criteria of a requirement list. Of course, the recipient may also unblock his items, if desired, e.g. for marketing purposes.

Items and criteria may be set to apply for one or more services using service selector 39.

Figure 4:
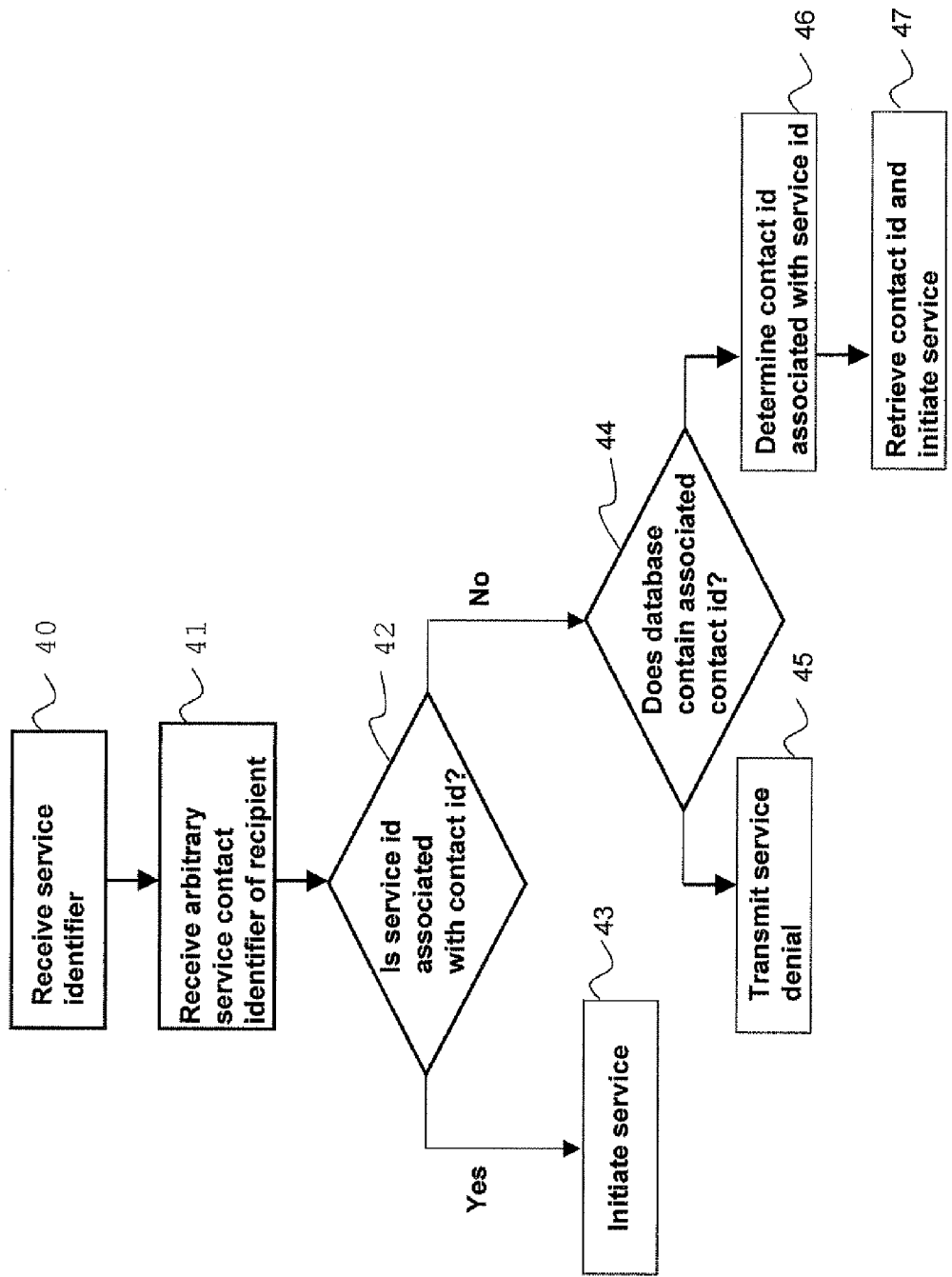
FIG. 4 shows a flow chart in accordance with an embodiment of the invention.

FIG. 4 illustrates a flow chart in accordance with an embodiment of the invention. The database 23 may store the following service contact identifiers of a recipient named Dirk.

| Service identifier | Service contact identifiers Dirk |
|---|---|
| Telephone | 1234567890 |
| Electronic messages | dirk@mail.com |
| Banking service | 50.37.56.587 |
| Browsing service | |
| Mail delivery | Laakseweg 24 Etten-Leur |
| Route navigation | Laakseweg 24 Etten-Leur |

In step 40, a service identifier is received by receiver 24 from user device 2A. The service identifier may e.g. relate to telephony, determined by service identifier analyser 28.

In step 41, an arbitrary service contact identifier of Dirk as listed in the above table is received by receiver 24 from user device 2A.

In step 42, the retrieval module 25 determines whether received service contact identifier is associated with the received service identifier.

As an example, if the service contact identifier is determined to be a telephone number, the telephony service can be initiated directly (step 43). Initiation of the telephony service can be performed by making a call request to the telephone number of the recipient using communication service provider 27. Alternatively, initiation may involve connecting to an external telephony system, using communication connection module 30.

However, in step 42, it may also be determined that the received service contact identifier is not associated with the received service identifier. In other words, the recipient cannot normally be contacted for the indicated service using the received service contact identifier.

In step 44, the retrieval module 25 determines whether or not the service contact identifier of the recipient/destination required for the intended service is available.

Suppose, the user of the device 2A would have desired a browsing service to a web page of Dirk, using the telephone number of Dirk as the arbitrary service contact identifier, a service denial would be transmitted to the device 2A (step 45), since the URL of the web page is not available (see the above table).

However, the system 1 allows the users requesting a telephone service to transmit the service contact identifiers associated with the electronic message service, banking service, mail delivery service and route navigation service. The retrieval module 25 would determine from the service identifier that a telephone number would be required for the indicated service and that the telephone number should be the telephone number of Dirk on the basis of one of the electronic message address dirk@mail.com, the bank account number 50.37.56.587, or the mail delivery/route navigation address Laakseweg 24 Etten-Leur (step 46).

Finally, in step 47, the retrieval module 25 would retrieve the telephony number 0123456789 from the database 23 and initiate the service. Initiation of the telephony service can be performed by making a call request to the telephone number 0123456789 of the recipient using communication service provider 27. Alternatively, initiation may involve connecting to an external telephony system, using communication connection module 30.

It is noted that instead of service initiation, the server system 1 may transmit the telephony number 0123456789 to the user device 2A.

Other examples include e.g. using a telephone number of a recipient to obtain routing information from the server system to a particular destination address or using an e-mail address to wire money to a particular bank account.

The possibility provided by the server system 1 allows that an arbitrary service contact identifier is sufficient to involve a recipient in a variety of services. Such a system is prone to abuse and measures may be taken to avoid that a recipient becomes engaged in a service without his approval.

Figure 5:
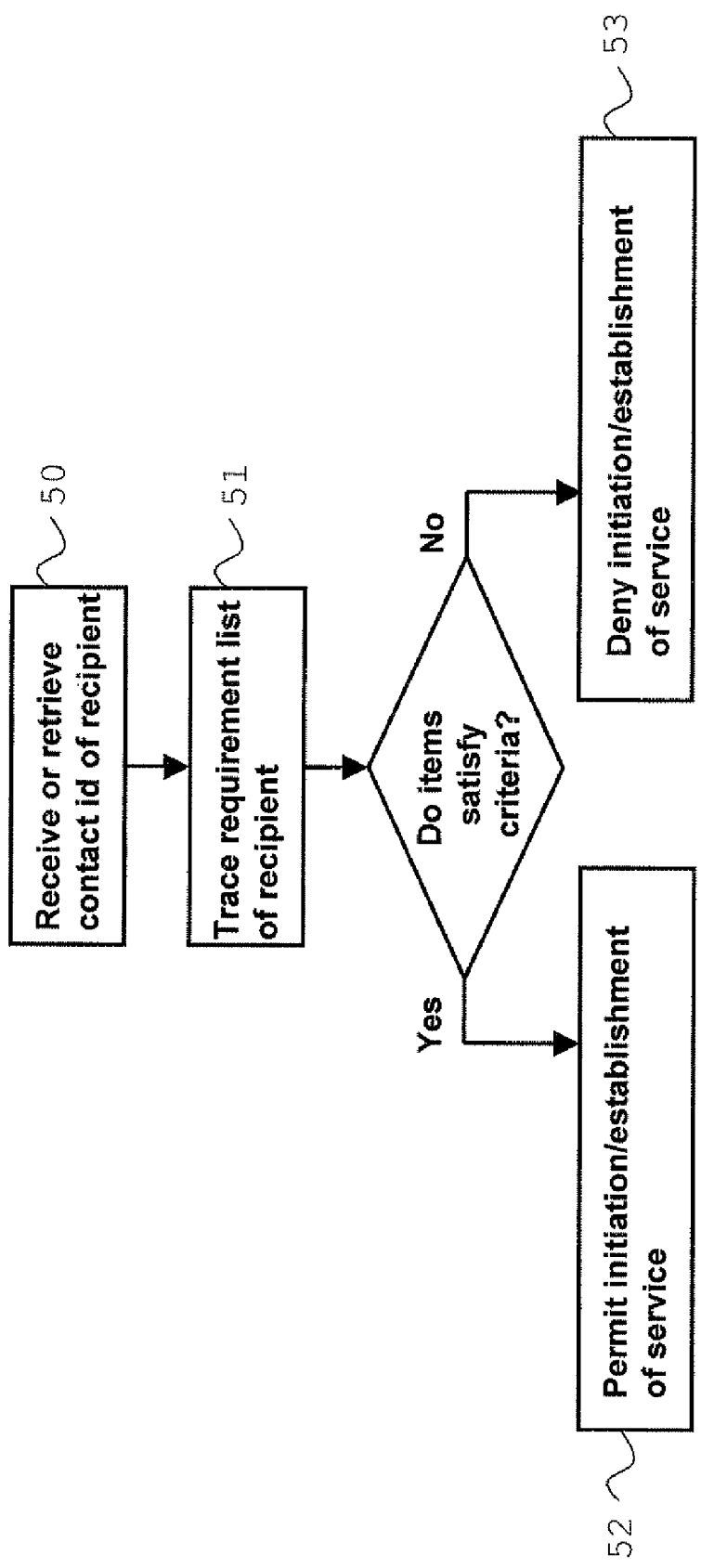
FIG. 5 shows a flow chart with steps that may be added to the flow chart of FIG. 4.

FIG. 5 shows a flow chart containing various steps of a method of permitting or denying service, e.g. service initiation or service establishment. In step 50, the receiver 24 receives a service contact identifier of the recipient from the user device 2A. The service contact identifier may be a telephone number, an e-mail address, a bank account number, a URL, a home address, a navigation location. In step 51, the requirement list of the recipient is traced in the database 23 on the basis of the received arbitrary contact identifier or on the basis of the retrieved service contact identifier after following the process described with reference to FIG. 4. In other words, the process steps of FIG. 5 may e.g. be performed after step 41 or after step 46 in FIG. 4. The requirement list may also be retrieved from another location. Also the profile of the user is traced, e.g. on the basis of login data received by the login module 32.

A check is then made by the analyser 35 whether or not all criteria of the recipient requirement list are satisfied by corresponding items of the user profile. If the criteria are met, service initiation or service establishment is allowed (step 52). Otherwise, service initiation or service establishment is denied.

Two cases may be distinguished.

Figure 6A:
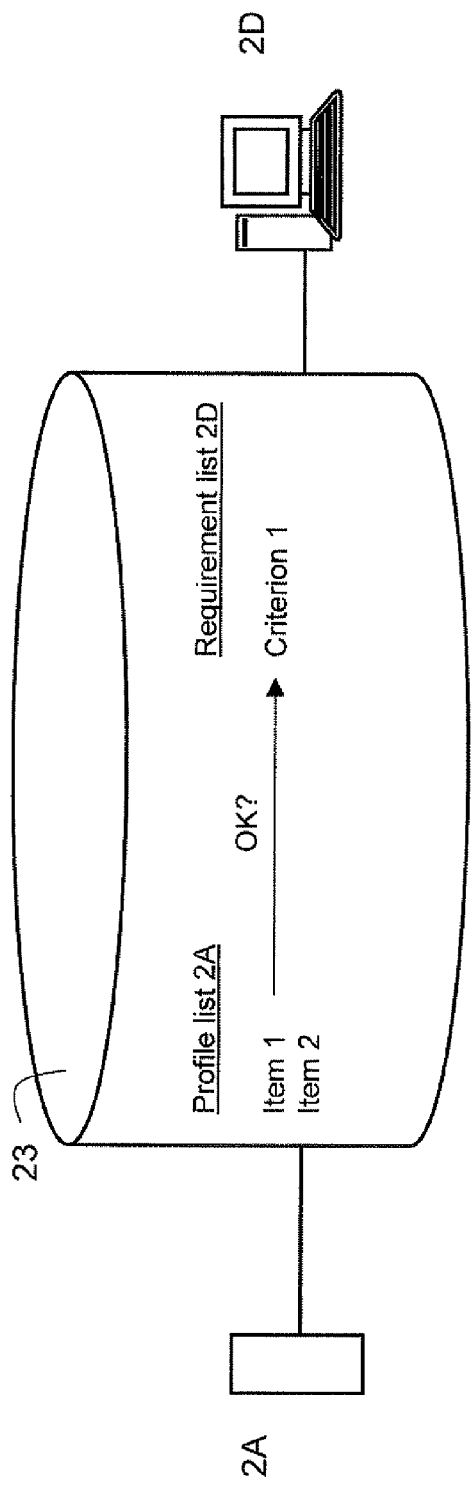
FIGS. 6A and 6B show situations relating to a system comprising profiles and requirement lists.

In a first case, shown in FIG. 6A, the analyser 35 only compares the one or more items of the profile of the user of the device 2A, 2C with the appropriate corresponding criteria of the intended recipient. If the items of the user profile fulfil the corresponding criteria of the recipient requirement list, service is allowed. As an example, the payment service provider 26 and/or the communication service provider 27 are activated. Other services that may be initiated are streaming media services, a regular mail service and/or a navigation service. On the other hand, if the items do not fulfil the criteria, service initiation or establishment are denied. This type of analysis is suitable for white listing and/or blacklisting approaches.

Figure 6B:
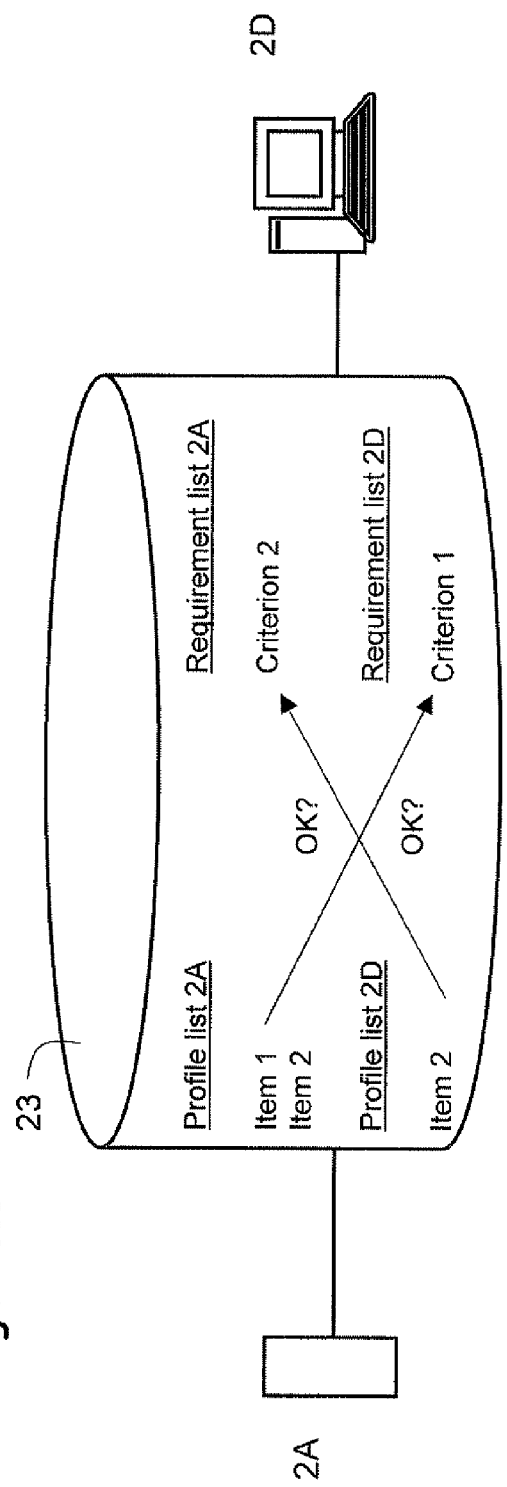

In a second case, shown in FIG. 6B, the analyser 35 not only makes the above comparison, but also analyses whether or not one or more items of the recipient profile fulfil criteria of the user requirement list. Service is denied if a user item of the user profile does not satisfy a recipient criterion of the recipient requirement list and/or if a recipient item of the recipient profile does not satisfy a user criterion of the user requirement list. Only if the items fulfil the criteria in both directions, the service initiation is permitted. This case can be referred to as a handshake case or a mutual approval case.

Figure 7:
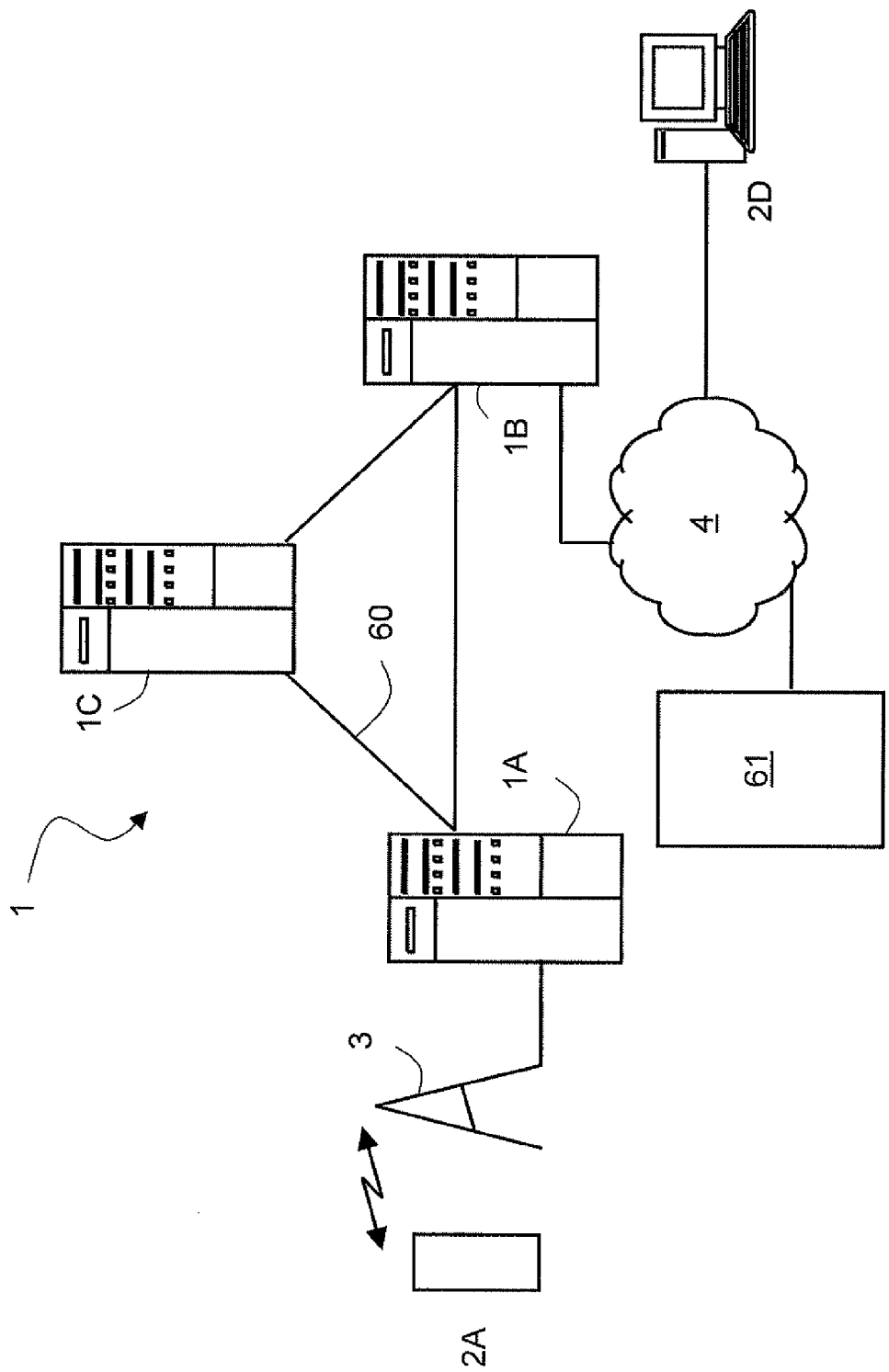
FIG. 7 shows a schematic illustration of a server system according to a second embodiment.

The server system 1 of FIG. 7 is an embodiment comprising multiple servers 1A-1C, wherein server functions and/or data are e.g. distributed over multiple servers connected by secured network connections 60. In FIG. 7, a payment service, a communication service, a regular mail service and/or a navigation service is executed by an external system 61. The external system 61 may be connected via a gateway (not shown) to the server system 1. Items and criteria may be distributed over the servers 1A-1C and be retrieved from the various servers 1A-1C upon request of a service. Such an embodiment may e.g. be useful to safeguard privacy.

The operation of the server system 1 will now be described for several practical situations with reference to FIGS. 8-14.

First, it is assumed that a business transaction is to be arranged between Ghislaine (user) and Dirk (recipient). Ghislaine only has a business card of Dirk displaying the e-mail address of Dirk.

The below table shows details of Dirk and Ghislaine stored in the database 23 of the server system 1.

| Name | Ghislaine | Dirk |
|---|---|---|
| Username | ***** | **** |
| Password | ***** | **** |
| Telephone number | +31 20 51 10 930 | 0123456789 |
| Bank account | | 50.37.56.587 |
| E-mail address | | dirk@mail.com |
| Website | | www.scipioo.com |

Figure 8:
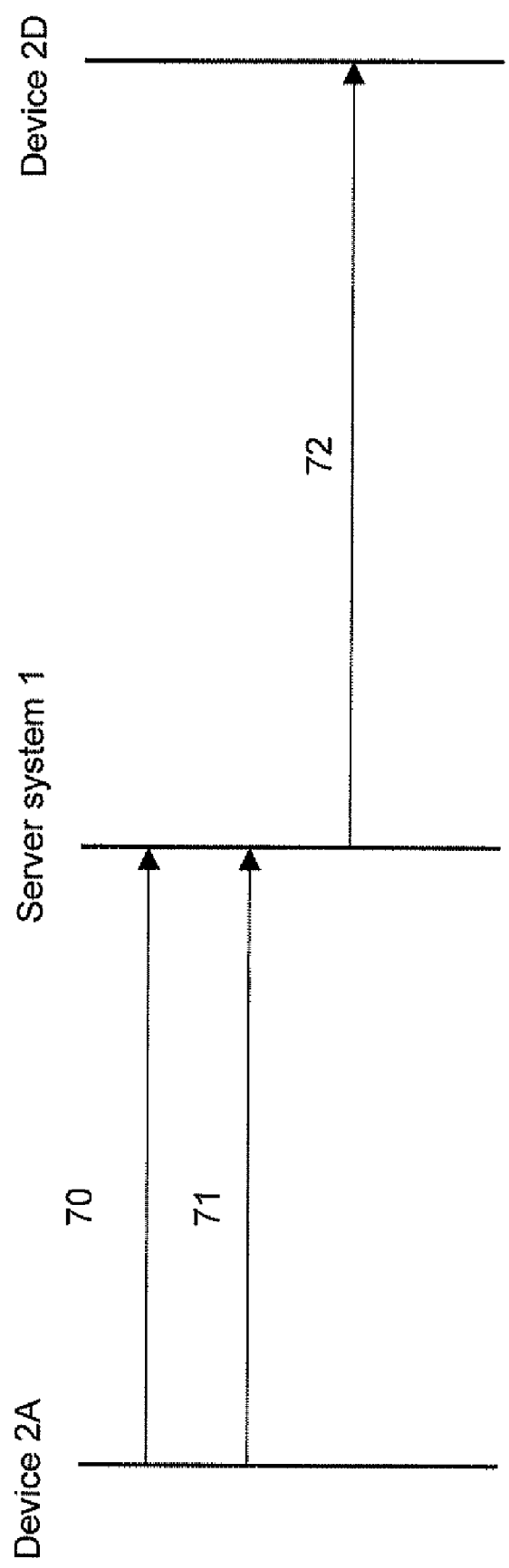
FIGS. 8-14 show various time diagram illustrating step of embodiments of a method using the system of FIG. 1 and FIG. 7.

FIG. 8 shows the situation wherein Ghislaine attempts to contact Dirk by telephone. She logs in on the server system 1 using login module 32 with her user name and password in step 70. Then, in step 71, she makes a phone call using the e-mail address dirk@mail.com which is received by the receiver 24. The retrieval module 25 determines the telephone number of Dirk in dependence of the phone call (service identifier) and the e-mail address. The analyzer 35 then checks whether items of Ghislaine's profile satisfy corresponding criteria of Dirk's requirement list as described with reference to FIG. 5. If this is true, the telephone connection can be made in step 72 via the telephony service provider 27.

In the telephone conversation, it is discussed that Ghislaine should wire a payment of €100 000 to the bank account of Dirk. Ghislaine is not aware of the bank account number of Dirk.

Figure 9:
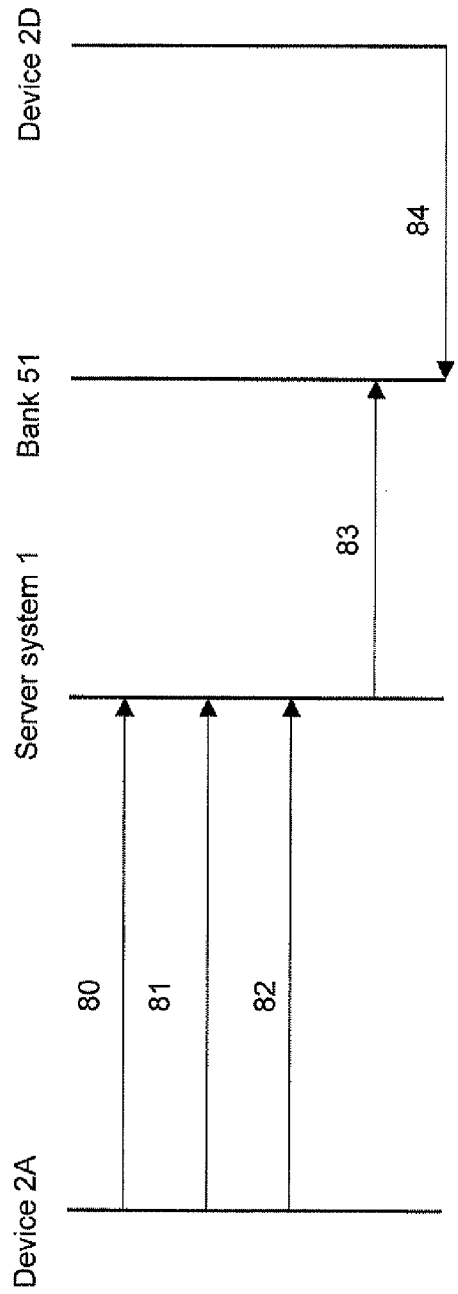

In FIG. 9, Ghislaine logs in on the server system 1 using login module 32 again using device 2A in step 80. Of course, logging in would not necessarily be required twice if the connection with server system 1 was maintained. The server system 1 presents an interface of the display 11 using a first session key. Ghislaine again enters the e-mail address of Dirk to make the payment (service identifier) to Dirk in step 81 and the server system 1 presents a further screen to enter a payment amount under a second session key, different from the first session key. The second screen may only be presented if Ghislaine's profile items satisfy Dirk's criteria as known from his requirement list. The payment amount of €100 000 is received by the server system 1 in step 82. Of course, the payment amount may also be received by the server system 1 in step 81, i.e. together with the e-mail address of the Dirk.

The determination module 31 determines that Dirk does not use the bank services of the server system 1. In response to this determination, the payment connection module 29 is activated to make the payment to an account on an external bank system 61 (FIG. 7) in step 83. Dirk may now use his device 2D to check with his bank 61 whether or not the payment has been made (step 84).

The profiles and requirement lists of Ghislaine and Dirk are provided in the below table.

| | Profile PUID (Ghisje) | Profile PUID (DiRk) |
|---|---|---|
| Gender | Female | Male |
| Age | 25 | 45 |

-continued

| Bank balance | BLOCKED | €1 500 000 |
|---|---|---|
| Industry | ICT (not verified) | ICT |
| SPAM notification | YES | NO |
| | Requirement list Ghisje | Requirement list DiRk |
| | Industry = ICT | Industry = ICT (verification required) Bank balance > €50 000 (for payment services) |

Figure 10:
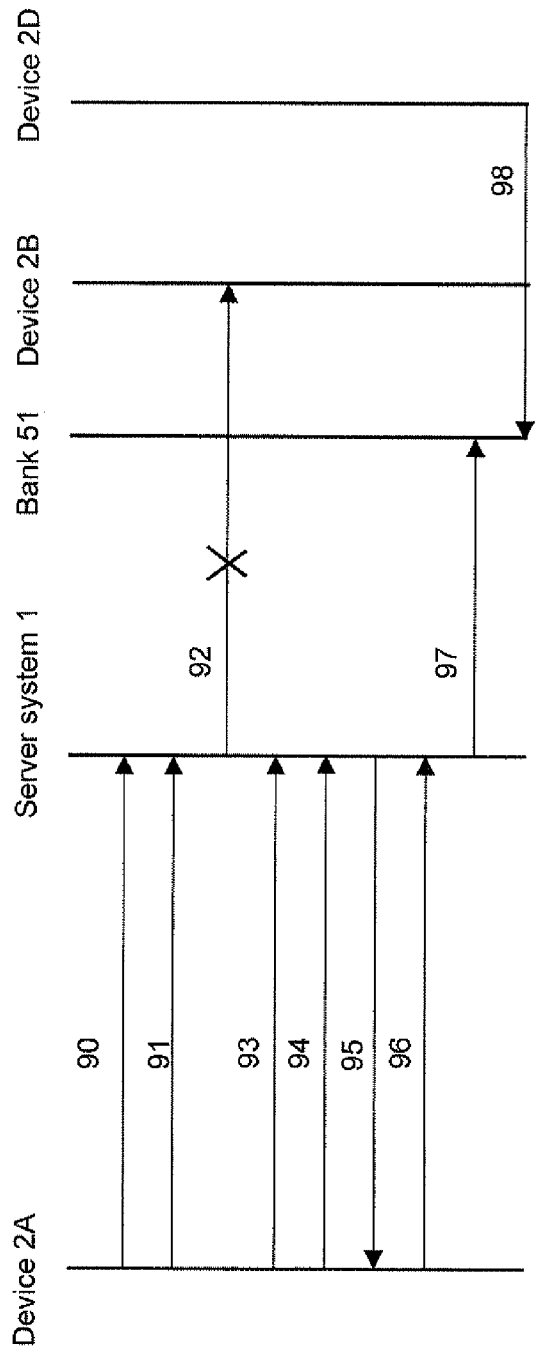

FIG. 10 shows a login step 90 of Ghislaine using the login module 32 for verifying the user name and password. In step 91, a composed message containing the e-mail address of Dirk and the service identifier indicated that a telephony service is requested is received by the receiver 24 and the service identifier analyser 28. Of course, steps 90 and 91 may also relate to a simple telephone call containing the telephone number of Dirk that is picked up by the system 1.

The e-mail address of Dirk is used by the tracer 35 to trace the requirement list of Dirk. The requirement list comprises a first criterion relating to the type of industry the other party should be involved in, viz. information and communications technology industry (ICT). This criterion should be fulfilled for all services. Moreover, the industry item of the profile of the other party (in this case Ghislaine) should be a verified item. The requirement list of Dirk comprises a second criterion prescribing that the bank balance of the other party should be higher than €50 000. However, this criterion is only relevant for payment services, which has been set using the service selector 39. Dirk may have entered these criteria in the server system 1 before the login step 90.

In the present case, the telephony service will not be provided, since the analyser 35 will find that, although the industry item in the profile of Ghislaine is ICT, this is not a verified item, such that the analyser 35 will not instruct the telephony service provider 27 to initiate a telephone connection (indicated by the cross in step 92).

This situation will force Ghislaine to have the industry item of her profile verified in the server system 1, e.g. by submitting contract details to the moderator of the server system 1. If this item is verified, a telephone connection between device 2A and device 2B can be established via the telephone service provider 27 in accordance with the case of FIG. 8.

It should be noted that if Dirk's requirement list would have contained a criterion that Ghislaine should not have been notified as a spammer on the server system 1, the analyser 35 would have never triggered the telephone service provider 27, since Ghislaine's profile list includes a system item indicating that she has received a spam notification. This item is by default a verified item that could not be prevented from checking by the analyser 35. The system item may either be valid for only one service or for multiple services. In a practical situation, it is envisaged that a spam criterion is by default part of the requirement list of any user and recipient (but may be removed from this list, as Dirk has done in the present example).

After the telephone conversation, Ghislaine again desires to wire a sum of €100 000 to the (external) bank account of Dirk. Ghislaine submits the e-mail address of Dirk to the server system 1 in step 73 together with a service identifier indicating that a payment service is required. This indication may be implicit by entering the amount of €100 000 in an amount field on the display 11, which amount is received in step 94. The e-mail address, the service identifier and the amount field may be received in a single composed message.

After tracing the requirement list of Dirk using tracer 35 on the basis of the e-mail address of Dirk, the analyser 35 finds that Dirk's requirement list also has a criterion, that should only be checked for payment services, wherein the other party has a bank balance of at least €50 000. When checking the corresponding item in the profile of Ghislaine, the analyser finds that this item is prevented from checking. This may be the default setting or may be set by Ghislaine using the checking prevention indication receiver 37 of the server system 1 (see table: BLOCKED). It should be appreciated that all items and criteria are not communicated to users of the server system 1 as such, but may be available for checking by the analyser 35, if not prevented. Consequently, the analyser 35 can not perform the check for the bank balance of Ghislaine in this case. The analyser 35 can again perform the check of the industry requirement. It is noted that if the bank balance requirement was also applicable for other services, such as the telephony service, the telephony service was not initiated before allowing the check of the bank balance (and if the bank balance was found to be insufficient, a telephony service would not be initiated). That is, criteria may either be applicable to one service or to a plurality of services.

Ghislaine may have chosen an option that in such a case, the notification transmitter 38 of the server system 1 notifies her, step 95, of the fact that Dirk's requirement list requires checking of her bank balance before a payment can be made. She may then chose to (temporarily) permit checking of her bank balance item, step 96. Subsequently, the analyser 35 may perform the check against the bank balance criterion of Dirk's requirement list and trigger the payment service initiator 25 to start the payment transaction (steps 97, 98 in accordance with steps 83, 84 of FIG. 9).

Figure 11:
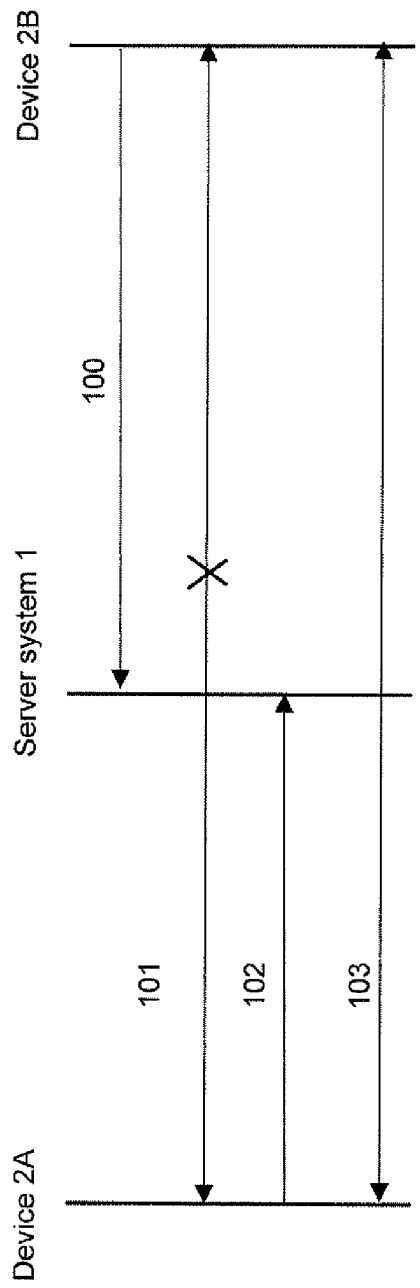

FIG. 11 provides yet another example of a method for permitting or denying service.

Deirdre and Henk have agreed to make a phone call. Henk uses his device 2B. The system 1 in step 100 receives the telephone number of Deirdre and tracer 34 traces the requirement list of Deirdre on the basis of the telephone number. The profile of Henk is also traced and the analyser 35 checks whether the items of Henk's profile satisfy the applicable corresponding criteria of Deirdre's requirement list. It is assumed that the analyser 35 finds that the items of Henk's profile satisfy the criteria of Deirdre's requirement list.

However, the system 1 has been set that mutual approval is required for initiating this service and, therefore, the telephone communication is not yet effected (indicated by the cross in step 101).

At a later moment, Deirdre contacts the system 1 (step 102) using Henk's telephone number. The tracer 34 now traces Henk's requirement list and the analyser 35 checks whether Deirdre's items match the criteria of Henk's requirement list. If the analyser 35 finds that the items of Deirdre's profile satisfy the criteria of Henk's requirement list, telephone communication may be initiated (step 103), either directly after the check or at a later time.

The embodiment of FIG. 11 uses the mutual approval method described with reference to FIG. 6B. It should be appreciated, however, that mutual approval does not necessarily require both parties to contact the system 1. In the above example, Henk's call would allow both checks to be made on the basis of the telephone number of Ghislaine and the contact details of Henk (e.g. his login data, a telephone number, the IMEI code etc.).

Figure 12:
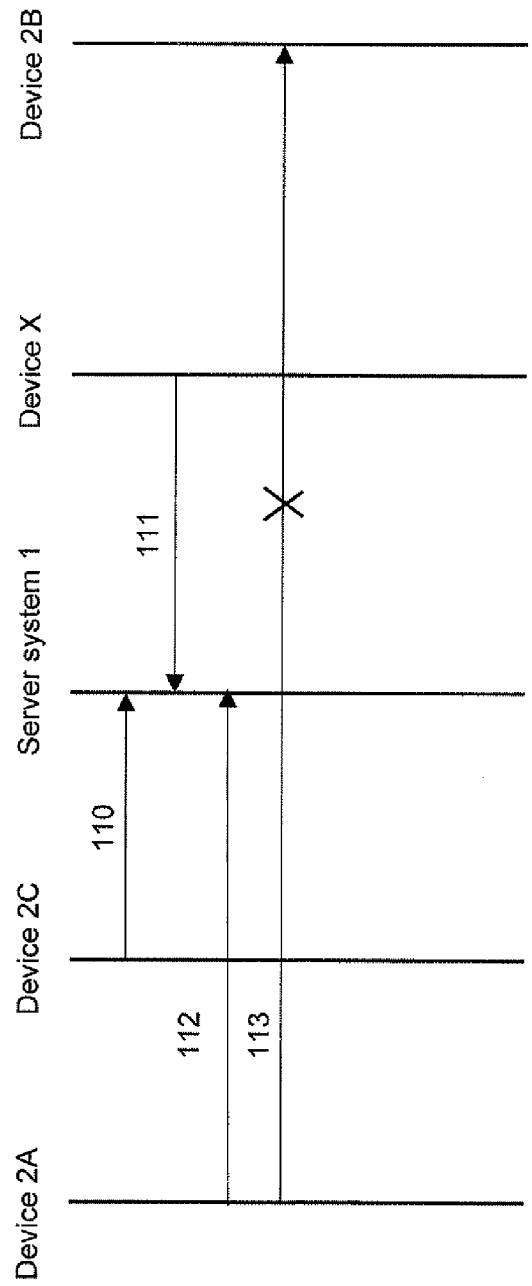

FIG. 12 shows a case wherein a user sends a spam e-mail from his user device 2C (step 110). In step 111, the system 1 receives a spam notification message of an arbitrary user device X. The spam notification message may be obtained in a manner described in the non-prepublished international patent applications PCT/NL2007/050557 and PCT/NL2007/050555 of the applicant which are incorporated in the present application by reference in its entirety. The profile of the user now has a system item reflecting that the user has been notified as a spammer. In step 112, the user makes a telephone call to recipient device 2B with his mobile phone 2A. The tracer 34 of the system 1 traces the recipient requirement list of the recipient. The analyser 35 finds out that the recipient requirement list contains a criterion that the recipient would not like to be involved in a service initiated by someone that is registered as a spammer. Consequently, a telephone connection will not be established, indicated by the cross in step 113.

Figure 13:
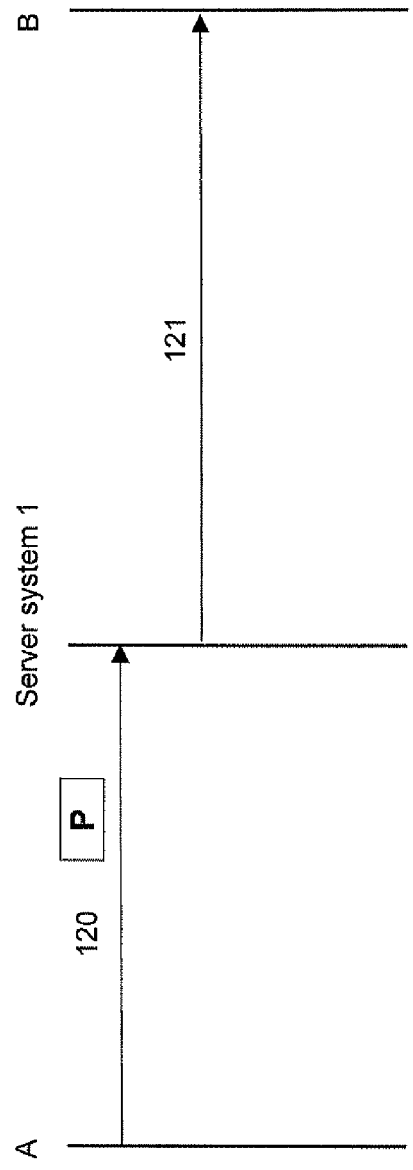

In FIG. 13, a user A sends a letter or parcel P to a company having access to the server system 1 (step 120). The letter contains an arbitrary contact identifier, e.g. a telephone number, of an intended recipient B. The fact that a mail delivery service is required is implicit. The arbitrary contact identifier is scanned and if the items on the profile list of user A satisfy the corresponding criteria of the requirement list of recipient B, the actual address of the recipient B is released by the system and the letter or parcel P can be delivered to the recipient at this address (step 121). Of course, the user A may also send the arbitrary contact identifier to the server system and obtain the address only if his item(s) satisfy the criteria of the recipient requirement list of B. Payment can also be arranged via the server system 1.

Figure 14:
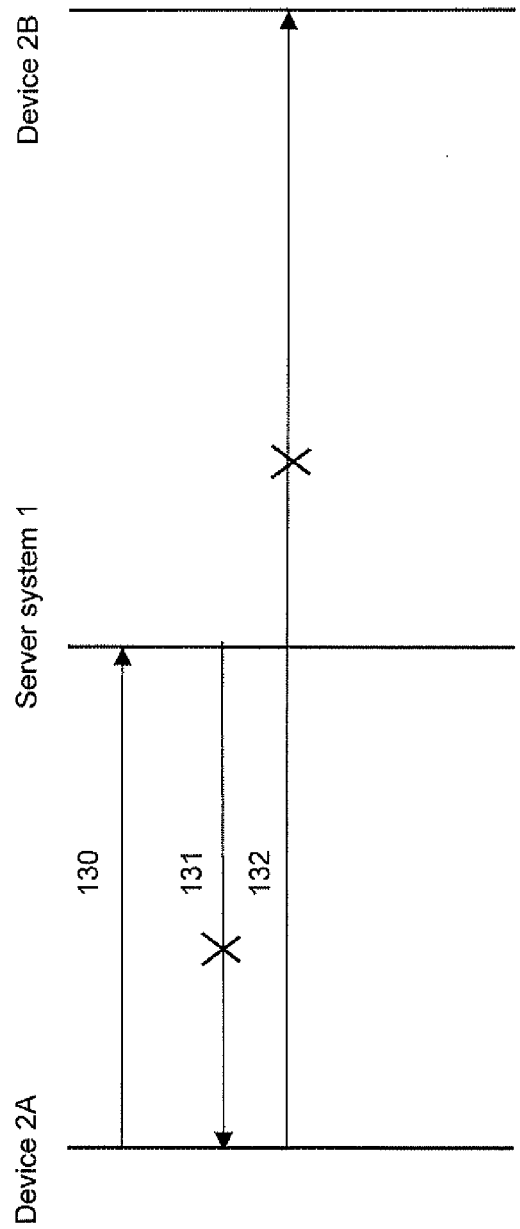

In FIG. 14, a user A enters a telephone number (or another arbitrary service contact identifier) of an intended location of another party B into his navigation device 2A (not necessarily a mobile phone). The navigation device 2A sends a request to the server system containing the telephone number and the service identifier identifying use of a navigation service for route information to this location (step 130). On receipt of the request, the analyser 35 checks whether the items on the profile list of user A satisfy the corresponding criteria of the requirement list of recipient B. As an example, the criterion of the requirement list of B is that navigation information should not be provided to patent attorneys. Since the profession item of user A indicates that user A is a patent attorney, navigation information is not provided to the navigation device 2A (indicated by the cross in step 131). Therefore, the patent attorney A will not be able to navigate to B using his navigation device 2A (indicated by the cross in step 132).

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

The invention claimed is:

1. A method of authorizing use of a first service, as identified by a first service identifier, by a user in a server system comprising at least one server configured for connecting to a user device of the user, the first service being provided to the user in relation to a recipient, the server system having access to a database comprising at least a first service contact identifier of the recipient required for providing the first service and a second service contact identifier of the recipient required for providing a second service, wherein the first service contact identifier is different from the second service contact identifier, wherein said database comprises a third service contact identifier of the recipient required for providing a third service, the third service contact identifier being different from the first service contact identifier and the second service contact identifier, the method comprising retrieving the first service contact identifier based on the received first service identifier and the received service contact identifier, irrespective of whether the received service contact identifier is the first, second or third service contact identifier, wherein the server system has access to a recipient requirement list of the recipient and a user profile of the user, wherein the recipient requirement list comprises a first criterion regarding a spam-related item of the user profile, the method performed by the server system comprising:

receiving the first service identifier from the user device of the user;

receiving at least one of the service contact identifiers of the recipient from the user device of the user;

if the received service contact identifier of the recipient is not the first service contact identifier, retrieving the first service contact identifier from the database based on the received first service identifier and the received service contact identifier;

tracing the recipient requirement list on the basis of at least one service contact identifier that is not the first service contact identifier;

checking by a computer processor whether the spam-related item of the user profile satisfies the first criterion of the recipient requirement list;

permitting the first service to be provided to the user in relation to the recipient using the first service contact identifier of the recipient if the spam-related item of the user profile satisfies the first criterion regarding the spam-related item of the recipient requirement list; and denying provision of the first service to the user in relation to the recipient if the spam-related item of the user profile does not satisfy the first criterion regarding the spam-related item of the recipient requirement list.

2. The method according to claim 1, wherein first and second service are selected from the group consisting of a telephony service, an electronic message service, a browsing service, a payment service, a streaming media service, a route navigation service and a mail delivery service.

3. The method according to claim 1, further comprising transmitting said first service contact identifier to said user device.

4. The method according to claim 1, wherein the recipient requirement list comprises a second criterion regarding a second item of the user profile, the method further comprising:

checking whether the second item of said user profile satisfies the second criterion of the traced recipient requirement list; and permitting the first service if the second item of the user profile satisfies the second criterion of the recipient requirement list and denying the first service if the second item of the user profile does not satisfy the second criterion of the recipient requirement list.

5. The method according to claim 1, wherein the server system has access to a user requirement list of the user and a recipient profile of the recipient and wherein the user requirement list comprises a first criterion relating to a spam-related item of the recipient profile, the method further comprising:

tracing the user requirement list;

checking whether the spam-related item of the recipient profile satisfies the first criterion of the traced user requirement list;

permitting the first service only if the spam-related item of the recipient profile also satisfies the first criterion of the user requirement list.

6. The method according to claim 5, further comprising tracing said user requirement list on the basis of at least one of login data received from said user device and from a service contact identifier received from a device of said recipient.

7. The method according to claim 4, wherein the server system is configured for permitting or denying the first service, the method comprising denying service initiation of the first service if the second item of the user profile does not satisfy the second criterion of the recipient requirement list.

8. The method according to claim 7, wherein said server system has access to a user requirement list of said user and a recipient profile of said recipient and wherein said user requirement list comprises a first criterion relating to a first item of the recipient profile, the method further comprising:
 tracing the user requirement list;
 checking whether the first item of the recipient profile satisfies the first criterion of said traced user requirement list;
 permitting the first service only if the first item of the recipient profile also satisfies the first criterion of the user requirement list.

9. The method according to claim 7, further comprising receiving a service selection in at least one of said user requirement list and said recipient requirement list.

10. The method according to claim 1, wherein the first criterion is independent of both the first and second service contact identifiers.

11. The method according to claim 1, wherein the spam-related item comprises a system item and/or a user defined item.

12. The method according to claim 4, wherein the second item of the user profile comprises a verified item.

13. The method according to claim 12, wherein said server system receives from at least one of a device of said user and a device of said recipient a verification indication that said at least one criterion of said requirement list relates to a verified item or an unverified item of said profile.

14. The method according to claim 4, wherein the second item of the user profile is prevented from checking and the server system receives from at least one of the user device and a recipient device a checking prevention indication indicating that the second item of the user profile is prevented from checking.

15. The method according to claim 14 and further comprising transmitting a notification request to the user device or the recipient device for whom a checking prevention indication applies, the notification request presenting an option to ignore the checking prevention indication to permit checking of the second item against a corresponding criterion of a requirement list.

16. A server system comprising software code portions that, when installed on and executed by a computer processor, perform a method of authorizing use of a first service, as identified by a first service identifier, by a user in a server system comprising at least one server configured for connecting to a user device of the user, the first service being provided to the user in relation to a recipient, the server system having access to a database comprising at least a first service contact identifier of the recipient required for providing the first service and a second service contact identifier of the recipient required for providing a second service, wherein the first service contact identifier is different from the second service contact identifier, wherein said database further comprises a third service contact identifier of the recipient required for providing a third service, the third service contact identifier being different from the first service contact identifier and the second service contact identifier, and wherein the retrieval module is configured for retrieving the first service contact identifier based on the received first service identifier and the received service contact identifier, irrespective of whether said received service contact identifier is the first, second or third service contact identifier, wherein the server system has access to a recipient requirement list of the recipient and a user profile of the user, wherein the recipient requirement list comprises a first criterion regarding a spam-related item of the user profile, the method comprising:
 receiving the first service identifier from the user device of the user;
 receiving at least one of the service contact identifiers of the recipient from the user device of the user;
 if the received service contact identifier of the recipient is not the first service contact identifier, retrieving the first service contact identifier from the database based on the received first service identifier and the received service contact identifier;
 tracing the recipient requirement list on the basis of at least one service contact identifier that is not the first service contact identifier;
 checking by a computer processor whether the spam-related item of the user profile satisfies the first criterion of the recipient requirement list;
 permitting the first service to be provided to the user in relation to the recipient using the first service contact identifier of the recipient if the spam-related item of the user profile satisfies the first criterion regarding the spam-related item of the recipient requirement list; and
 denying provision of the first service to the user in relation to the recipient if the spam-related item of the user profile does not satisfy the first criterion regarding the spam-related item of the recipient requirement list.

17. A server system configured for authorizing use of a first service, as identified by a first service identifier, by a user, the first service being provided to the user in relation to a recipient, the server system comprising:
 a database comprising:
  a first service contact identifier of the recipient required for providing a first service;
  a second service contact identifier of the recipient required for providing a second service, wherein the first service contact identifier is different from the second service contact identifier;
  a third service contact identifier of the recipient required for providing a third service, the third service contact identifier being different from the first service contact identifier and the second service contact identifier, and wherein the retrieval module is configured for retrieving the first service contact identifier based on the received first service identifier and the received service contact identifier, irrespective of whether said received service contact identifier is the first, second or third service contact identifier;
 a receiver configured for:
  receiving the first service identifier from a user device of the user;
  receiving at least one of the service contact identifiers of the recipient from the user device;
 a retrieval module configured for retrieving said first service contact identifier from said database based on the received first service identifier and the received service contact identifier, irrespective of whether said received service contact identifier is said first service contact identifier or said second service contact identifier;

a tracer configured for tracing a recipient requirement list of the recipient on the basis of at least one service contact identifier that is not the first service contact identifier, the recipient requirement list comprising a first criterion regarding a spam-related item of a user profile of the user;

an analyzer configured for analyzing whether the spam-related item of the user profile satisfies the first criterion of the recipient requirement list; and a service authorizer configured for:
permitting the first service to be provided to the user in relation to the recipient if the spam-related item of said user profile satisfies the first criterion of the recipient requirement list; and
denying the first service to the user if the spam-related item of the user profile does not satisfy the first criterion of the recipient requirement list.

18. The server system according to claim 17, wherein the first and second service are selected from the group consisting of a telephony service, an electronic message service, a browsing service, a payment service, a streaming media service, a route navigation service and a mail delivery service.

19. The server system according to claim 17, wherein said server system further comprises a service provider configured for providing a service to said user in accordance with said first service identifier.

20. The server system according to claim 17, wherein said server system is further configured for transmitting said first service contact identifier to said user device.

21. The server system according to claim 17, wherein
the recipient requirement list comprises a second criterion regarding a second item of a user profile;
the analyzer is further configured for analyzing whether the second item of the user profile satisfies the second criterion of the traced recipient requirement list; and
the service initiator is further configured for permitting said the first service to be provided to the user in relation to the recipient if the second item of the user profile satisfies the second criterion of the recipient requirement list and denying the first service to the user if the second item of the user profile does not satisfy the second criterion of the recipient requirement list.

22. The server system according to claim 21, wherein:
the tracer is further configured for tracing a user requirement list of the user and a recipient profile of the recipient, the user requirement list comprising a first criterion relating to a spam-related item of the recipient profile;
the analyzer is further configured for analyzing whether said the spam-related item of the recipient profile satisfies the first criterion of the traced user requirement list;
the service initiator is configured for permitting the first service to be provided to the user in relation to the recipient only if the spam-related item of the recipient profile also satisfies the first criterion of the user requirement list.

23. The server system according to claim 22, wherein said system comprises a login module for receiving login data and said tracer is configured for tracing said user requirement list on the basis of said login data or on the basis of a user identifier received from a device of said recipient.

24. The server system according to claim 21, wherein said server system is configured for permitting or denying the first service and the service initiator is configured for denying service initiation of the first service if the second item of the user profile does not satisfy the second criterion of the recipient requirement list.

25. The server system according to claim 24, wherein the server system has access to a user requirement list of the user and a recipient profile of the recipient and wherein the user requirement list comprises a first criterion relating to a spam-related item of the recipient profile, wherein the service initiator is configured for permitting the first service only if the spam-related item of the recipient profile also satisfies the first criterion of the user requirement list.

26. The server system according to claim 24, wherein said server system further comprises a service selector configured for containing a service selection in at least one of said user requirement list and said recipient requirement list.

27. The server system according to claim 17, wherein the first criterion is independent of any of the service contact identifiers.

28. The server system according to claim 17, wherein the spam-related item comprises a system item and/or a user defined item.

29. The server system according to claim 21, wherein at least one of the spam-related item and second item of the user profile comprises a verified items.

30. The server system according to claim 29, further comprising a verification indication receiver configured for receiving and processing a verification indication from at least one of the user device, a device of the recipient, the verification indication indicating that the first criterion of the user requirement list relates to a verified item of the user profile.

31. The server system according to claim 21, wherein the second item is prevented from checking, the system comprising a checking prevention indication receiver configured for receiving and processing a checking prevention indication from at least one the user device and a device of the recipient, the checking prevention indication indicating that the second item of the user profile is prevented from checking by the analyser.

32. The server system according to claim 31, wherein the system further comprises a notification transmitter configured for transmitting a notification request to the user device or a device of the recipient for whom a checking prevention indication applies, the notification request presenting an option to ignore the checking prevention indication to permit checking of the second item against the second criterion of the recipient requirement list.

* * * * *